Feb. 8, 1944.  H. T. PEIRSON  2,340,897
INSECT TRAP
Filed June 19, 1939
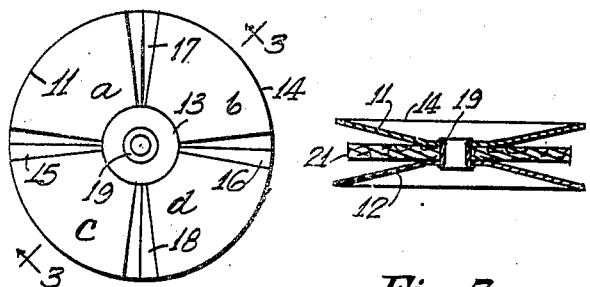
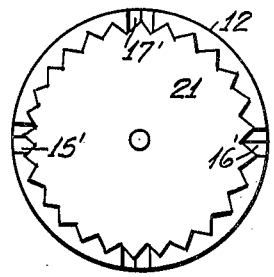
Fig.1  Fig.3  Fig.4
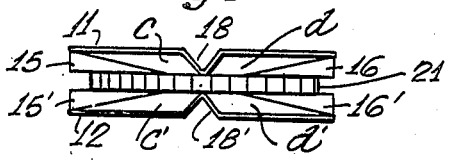
Fig.2
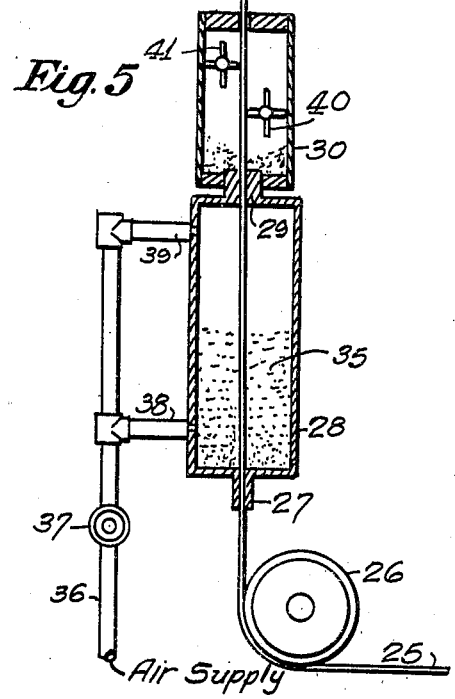
Fig.5
INVENTOR.
Harold T. Peirson
BY M. N. Loughridge
ATTORNEY.

Patented Feb. 8, 1944

2,340,897

UNITED STATES PATENT OFFICE 2,340,897

INSECT TRAP

Harold T. Peirson, Brooklyn, N. Y.

Application June 19, 1939, Serial No. 279,787

1 Claim. (Cl. 167—48)

This invention relates to insect traps and is particularly adapted for destroying the common clothes moths. The invention has for an object to provide a trap which can be readily produced by production methods; that is made from inexpensive materials and can be destroyed after use and a further object of the invention is to provide a pair of discs made from cardboard or similar material and spaced from a pad of animal fibre which is impregnated with a suitable lure to attract the insects.

The invention also includes a lure in powder form that will not decompose and that may be mixed with a powdered insecticide and applied to the fabric by air pressure.

Other objects of the invention will be more particularly understood from the following specification and the accompanying drawing, in which:

Fig. 1 is a top plan view of a disc form of an insect trap embodying my invention;

Fig. 2 is a front elevation of the trap shown in Fig. 1;

Fig. 3 is a sectional elevation taken on line 3—3 of Fig. 1;

Fig. 4 is a top plan view of the insect trap with the top disc removed, and

Fig. 5 is a diagram, partly sectioned, showing one method of applying the pulverized lure to the animal fibres which are used in the trap to attract the insects.

This invention is a continuation in part of my copending application 176,423, filed November 26, 1937. A description of the habits of clothes moths will be found in leaflet No. 145, U. S. Department of Agriculture.

The present invention comprises a pad, or member, of animal fibre, such as raw wool, hair, etc., which may be woven, or felted into sheet stock. This stock is impregnated with a lure which may also include a poison agent, hereinafter described to attract the female house moth when they are on the wing. This pad is placed between a pair of discs which may be made from cardboard or similar material. These discs are cup-shaped with the concave side turned outwards and the convex side placed against the fabric pad. In this position the parts are secured together by a central fastening, such as a grommet.

In this construction the space on each side of the fabric disc tapers from the edge towards the center so that the moth is subject to the pressure of the outer discs as it crawls in towards the center. The fabric stock is usually not sufficiently rigid to hold its shape in packing and shipping and in use and in order to maintain this stock centered between the outer discs these discs are provided with a plurality of radial V-grooves which correspond in depth with the concavity of the discs so that the edge of each groove projecting from the center is on a straight line and is parallel with the edge of the corresponding grooves in the opposing discs. These V-grooves provide intermediate supports for the fabric and maintain the tapering segments of the device into which the insect may crawl.

It has been found from numerous tests that certain kinds of lure will attract the house moth away from woolen garments and from furs and when the moth trap is baited with this lure the moth and its eggs can be captured and destroyed. A lure made from proteins without animal fat secures this result. In practice the most convenient substance for this purpose is powdered milk, which is obtained by dehydrating milk after the butter fat has been removed. Powdered milk in this form is sold commercially, it will keep and can be stored in ordinary atmospheric conditions without decomposing. The purpose of the lure is to attract the insect; the insect may be destroyed in the trap by providing an adhesive therein as described in my co-pending application above referred to. It is found more convenient to provide a pulverized insecticide which can be mixed with the powdered milk. Arsenic is available in this form and can be mixed with the powdered milk providing a lure in powdered form which is easy to apply and easy to handle and does not deteriorate to any extent with age.

The pulverized lure is preferably applied to the fabric by air pressure so that the pores are thoroughly saturated. The fabric after being impregnated is subject to a beating action which removes the loose and superfluous powder. After this, the fabric, by a punch and die, is cut to the shape desired and assembled between the protecting discs.

In the drawing, 11 is the top disc of cardboard or similar material, and 12 is the bottom disc which corresponds in shape to the top disc. These discs are concave on the outer surface and convex on the inner surface and have a central portion at 13 which is flat. Radiating from 13, the V-grooves 15, 16, 17 and 18 are provided, dividing the discs into segments a, b, c and d. It will be noted from Fig. 2 that the V-grooves correspond in depth with the concavity of the disc so that the inner edge of the grooves form a straight line developed from the inner face of the flat portion 13. This divides the space below the discs into sections a, b, c and d which taper from the opening around the edge of the device down to zero at the center. The bottom disc has V-grooves corresponding to the top disc and which are indicated by corresponding reference numerals with a prime mark.

The fabric disc 21 may be made of raw wool or animal fibres and is preferably provided with a notched edge as indicated in Fig. 4 which increases the exposed area of the edge of the fabric. This fabric pad is substantially co-extensive with the protecting discs and is placed between these discs as indicated in Figs. 2 and 3 with the convex side of each disc placed against the fabric. In this position the discs and the fabric are secured together, preferably by a grommet 19 as shown, through the grommet the device may be placed on a nail or pin when it is in use.

The female moth selects a tight, dark place with a suitable food supply in which to lay its eggs. After this the moth dies and the eggs develop into larvae which feed on the lure and on the fabric and are thereby destroyed by the insecticide. The spaces below the segments a, b, c, and d of the discs provide tapering retreats, one portion of which is formed by the treated fabric which is selected by the moth prior to laying its eggs.

The fabric for the pads 21 may be prepared as indicated in Fig. 5 in which 25 is a band of the fabric which passes over roller 26 and through a restricted orifice at 27 into cylinder 28 which is provided with the pulverized lure and poison 35. From here it passes out through 29 and through the cylinder 30, over roller 31, between the dies 32 and 33 where the plunger 34 cuts it to the shape desired.

The cylinder 28 is supplied with air under pressure from pipe 36, through valve 37 and connections 38 and 39 so that the air pressure agitates the powder and forces it into the pores of the fabric. As the powder is in a dry form the band 25 may take up an excess of the powder and in cylinder 30 beaters 40 and 41 are provided, driven by means not shown in the drawing, which beat the fabric and shake off the surplus powder into cylinder 30.

Having thus described my invention, I claim:

An insect trap comprising an animal fabric and a lure of powdered milk from which the fat content has been removed mixed with a powdered insecticide said powdered lure being forced into the pores of the fabric.

HAROLD T. PEIRSON.